United States Patent
Kalverkamp et al.

(10) Patent No.: US 9,357,694 B2
(45) Date of Patent: Jun. 7, 2016

(54) SEPARATION SYSTEM FOR A POTATO HARVESTING MACHINE OR A PREPARATION MACHINE

(71) Applicant: Grimme Landmaschinenfabrik GmbH & Co. KG, Damme (DE)

(72) Inventors: Klemens Kalverkamp, Damme (DE); Franz-Josef Dettmer, Ankum (DE); Christian Döhmann, Alfhausen (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 0 days.

(21) Appl. No.: 14/421,180

(22) PCT Filed: Aug. 13, 2013

(86) PCT No.: PCT/EP2013/002447
§ 371 (c)(1),
(2) Date: Feb. 12, 2015

(87) PCT Pub. No.: WO2014/026766
PCT Pub. Date: Feb. 20, 2014

(65) Prior Publication Data
US 2015/0201553 A1   Jul. 23, 2015

(30) Foreign Application Priority Data
Aug. 14, 2012  (DE) .......................... 10 2012 016 057

(51) Int. Cl.
*B07B 4/00*     (2006.01)
*A01D 33/04*    (2006.01)
(Continued)

(52) U.S. Cl.
CPC ................ *A01D 33/04* (2013.01); *A01D 33/08* (2013.01); *B03B 4/04* (2013.01)

(58) Field of Classification Search
CPC ........................................................ B03B 4/04
USPC .................................... 209/20, 142, 147, 472
See application file for complete search history.

(56) References Cited

U.S. PATENT DOCUMENTS 1,782,391 A * 11/1930 Davis ........................ B03B 4/00
                                                    209/467
3,799,339 A *  3/1974 Breitholtz ................ B07B 7/01
                                                    209/135

(Continued)

FOREIGN PATENT DOCUMENTS

DE        747 316       9/1944
DE        854 597       11/1952

(Continued)

*Primary Examiner* — Terrell Matthews
(74) *Attorney, Agent, or Firm* — Gudrun E. Huckett (57) ABSTRACT

The invention relates to a separation system for a potato harvesting machine or a preparation machine for separating potatoes, or similar crops, from a mixture of clods, stones, and similar solid bodies. A conveying assembly is thereby utilized to feed the essentially compact mixture as a delivery flow, from where the mixture displaced into the area of at least one drop stage, and thereby influenced by way of a conveying means in the form of an air stream, can be separated. Thereafter, at least the harvested material and the solid bodies, respectively, can be moved on as individual separated goods, and can be moved out of the separation system. The system according to the invention is characterized in that subsequently to the drop stage bringing about a loosening of the mixture, at least one retaining element located opposite the falling separated goods and interacting with the at least one air stream is provided. It is thus achieved in a surprisingly simple way that from there, at least the harvested material and the solid bodies, respectively, can be moved on separately in an essentially opposite conveying direction as sorted individual lots.

26 Claims, 8 Drawing Sheets (51) Int. Cl.
*A01D 33/08* (2006.01)
*B03B 4/04* (2006.01)

(56) References Cited

U.S. PATENT DOCUMENTS

| | | | | |
|---|---|---|---|---|
| 4,515,276 | A * | 5/1985 | Feller | A01D 33/04 209/44.2 |
| 4,865,721 | A * | 9/1989 | Smith | B07B 4/02 209/135 |
| 6,354,440 | B1 * | 3/2002 | Thone | B07B 4/00 209/644 |
| 7,104,403 | B1 * | 9/2006 | Stephens | B07B 7/04 209/132 |
| 7,422,114 | B2 * | 9/2008 | Guptail | B03B 4/06 209/143 |
| 7,708,145 | B2 * | 5/2010 | Li | B03B 4/02 207/471 |
| 8,800,776 | B2 * | 8/2014 | Linnhoff | B03B 4/005 209/20 |
| 8,961,285 | B2 * | 2/2015 | Ricketts | A01D 90/02 460/114 |
| 2015/0201553 | A1 * | 7/2015 | Kalverkamp | A01D 33/04 209/472 |

FOREIGN PATENT DOCUMENTS

| | | |
|---|---|---|
| DE | 908 808 | 4/1954 |
| DE | 356 | 10/1954 |
| DE | 928 017 | 5/1955 |
| DE | 1 607 628 | 9/1969 |
| DE | 77 04 826 | 7/1977 |
| DE | 26 22 277 | 10/1977 |
| DE | 28 31 051 | 2/1979 |
| DE | 204 829 | 12/1983 |
| DE | 206 884 | 2/1984 |
| DE | 210 847 | 6/1984 |
| DE | 217 400 | 1/1985 |
| DE | 35 29 416 | 2/1987 |
| EP | 0 613 615 A1 | 9/1994 |
| GB | 636 100 | 4/1950 |
| GB | 711 984 | 7/1954 |

* cited by examiner

SEPARATION SYSTEM FOR A POTATO HARVESTING MACHINE OR A PREPARATION MACHINE

BACKGROUND OF THE INVENTION

The invention concerns a separation system for a potato harvesting machine or a preparation machine for root crop or similar crop for separating crop from a mixture with clods, rocks, and similar solid bodies, comprising a conveying device supplying the substantially compact mixture as a conveyed stream, from where the mixture, moved into the area of at least one drop stage and, in the process, influenced by means of a conveying medium in the form of an air stream can be separated such that at least the crop as well as the solid bodies, can be further conveyed and discharged from the separation device as individuals separated goods, respectively.

For separating potatoes or similar crop from a mixture with clods, rocks, and similar solid bodies, different concepts of separation systems are known in which the crop mixture can be influenced in a conveying phase by means of an additional air stream. In DE 747 316 a device is proposed that guides the mixture into an air channel so that, in its longitudinal extension, the crop in the form of potatoes is further advanced and the comparatively heavy solid bodies can be discharged through a bottom trap. In a device according to DE 854 597, the mixture is directly loaded by an air stream so that sorting of the components of different weight is realized in accordance with a trajectory.

The constructions according to DE 908 808 and DE 928 017 show respective conveying belts on which the mixture by means of a tangential air stream can be separated into the individual parts. In a similar construction according to DE 1 607 628, a conveying stretch is defined by means of respective conveying rollers with contours meshing tooth-like with each other so that an air stream which is vertical thereto effects a mixture separation. In a rock separating system according to DE 26 22 277, a vibrating rubber belt is utilized onto which the mixture is supplied and, in the process, the tubers under the effect of an air stream are conveyed farther at the top side. The comparatively heavy rocks or similar admixtures can pass through the rubber belt and are separated in this way from the crop.

DE 28 31 051 describes a potato harvesting machine in which a nozzle-shaped blower is directed onto a transport belt conveying away the haulm components. A similar construction is shown in DE 35 29 416 wherein, below the supply of the mixture, a blower is directed onto the sorting belt. DE 77 04 826 also provides a conveying belt which receives the mixture wherein a blower effecting separation is oriented opposite to its conveying direction. In the solutions according to DD 3516, DD 206 884, and DD 210 847, there are respective multi-stage separation systems for root crop which interact with an air stream in a sorting phase. According to EP 0 613 615, the falling mixture is exposed to an air stream in such a way that in particular the haulm components are forced into a receiving slot between two transport rollers and the thus individualized potatoes are moved farther due to their weight.

According to GB 636,100, a generally known blower channel is utilized in which at the end a flap is provided that deflects the sorted goods, and in a solution according to GB 711,984 the venting action is oriented such that in the area of a cascade-like arranged construction the air stream is acting toward respective compartments and fills the latter with different components of the mixture that has been separated in this way. A similar construction is disclosed in U.S. Pat. No. 4,515,276 wherein a mixture of crop and rocks fall onto an endless conveyor belt and, in the process, an additional air stream is acting as a separation aid. The separation of the parts is realized in that in the area of the conveying belt a gravitation layering process detaches the heavier from the lighter materials and these two "layers" can be conveyed away by a "rolling movement" and a conveying belt movement in different directions.

According to DD 204 829 a construction is proposed in which the crop is removed by suction from the mixture, and in DD 217 400 the mixture components which are moved on a conveyor belt are classified by means of a sensor system and subsequently discharged in sorted lots.

The invention concerns the problem of providing a separation system for a potato harvesting machine or similar machines for processing root crop by means of which the separation of the crop from the mixture is realized at higher throughput performance, wherein with separation conditions that can be optimized a crop can be conveyed away that is free of contaminants and free of product damage, and wherein the system as a whole enables a reduction of the energy expenditure.

SUMMARY OF THE INVENTION

The invention solves this object with a separation system that comprises downstream of the drop stage that is effecting loosening of the mixture at least one retaining element that is facing the falling goods to be separated and is interacting with the at least one air stream in such a way that, beginning thereat, at least the crop and the solid bodies, as respectively sorted individual parts, can be separately conveyed farther in a respective conveying direction extending essentially in opposite directions. Further advantageous embodiments result from the dependent claims.

Based on the known separation systems for harvested root crop mixtures in potato harvesting machines or similar preparation machines in which the crop/solid body mixture is already exposed in a separation phase to an air stream, the concept according to the invention provides a system which is acting as a compact functional unit with at least one air stream that is preferably generated by a blower device. The machine or system is distinguished in a central separation structure in that, downstream of a drop stage which is effecting loosening of the mixture, at least one retaining element is provided which is facing the falling goods to be separated and with which at least one air stream is interacting. This retaining element that brakes the fall of the mixture and "excites" the mixture can be integrated at an optimizable position in the mixture conveying path.

In the area of this retaining element, the at least one air stream is guided such that at least the crop and the solid bodies, as respectively sorted individual parts, can be separately conveyed farther in respective conveying directions that move them essentially in opposite directions.

The functional linking provided for this purpose of essentially known components for conveying and air stream generation leads in the area of the retaining element to a separation unit in whose area the retaining element is interacting like an exciting or separating conveying plate with the falling mixture which is loosening in the air stream. For the mixture supplied for separation, a "fluidic separation bed" is thus defined above the retaining element that is exposed to the air stream. In this area, the individual parts of the mixture can assume at least phase-wise a "floating" or "suspended" excitation position and can be separately conveyed away from the latter.

This excitation, effected with utilization of the drop stage, can be still further enhanced by targeted introduction of the at least one air stream and/or by an additional mechanical activation, for example, by means of vibration excitation in the area of the retaining element. For separation of the individual parts, the effect is utilized that the mixture in the "separation bed" is present in the form of a "suspension" with suspended components. In this phase, the additional air stream can be utilized for a conveying effect which is overcoming the action of gravity so that the heavier solid bodies, in particular rocks, are moved in a conveying direction substantially only by the rebound on the retaining element and the crop, which is more strongly affected by the air stream, is conveyed outward in a direction that is displaced thereto or opposite thereto.

This surprisingly simply achievable effect of opposite movement of crop and solid bodies can be optimized in that, for example, the position of use or mounted position of the retaining element can be embodied to be variable. Also, a process control operating by means of several air streams, wherein the air streams are acting "turbulently" above the excitable and exciting retaining element or within the herein generated "fluidic separation bed", can be provided for a separation phase which is adjusted in particular to the respective different structures of the mixture.

It has been found to be advantageous that in the area of the retaining element two air streams are acting. In this context, it is provided that a first air stream flows through the retaining element. A second air stream is provided above an upper separation plane, in the area of the "separation bed", wherein this air stream can be used individually or together with the first air stream.

The central component group for the system in the area of the retaining element is designed such that here at least an actuating member or supporting member is provided which affects the position and/or the movement of the retaining element. With this actuating member, the definable separation stretch or "separation bed" can be variably influenced in the area of the excitable retaining element. Conceivable is that by a control of the actuating member a process control can be realized which is adaptable to the respective mixture conditions.

Above the retaining element which at least partially can be flowed through by one of the air streams, a separation plane with variable dimensions can be constructively defined so that it is located at least phase-wise below the crop as well as the solid bodies in a loosened state that is excited by the process conditions.

It has been found to be advantageous that in the area of the retaining element at least above the separation plane in particular two air streams are provided that can be oriented with different directions of action onto the crop and the solid bodies. They can advantageously extend relative to the separation plane in the form of a lifting air stream that is perpendicular thereto and a transverse air stream. An optimal effect onto the "excited mixture" is then realized in particular in a zone in which these two flows are meeting each other.

The afore described excitation concept has the effect that, by means of the retaining element, a movement that is acting at least in the one sorting direction can be imparted onto the crop and a movement that is acting in the discharge direction can be imparted onto the solid bodies, respectively. The separated individual parts in accordance with these conveying directions are taken over by means of downstream conveying components.

The concept provides that the separation of the crop from the solid bodies in the area of the separation plane is advantageously realized by means of gravity, rebound and/or airflow effect(s). It has been found that by respective superimposed excitation effects a particularly effective separation of the individual parts can be initiated and in this context a high throughput performance can be achieved with comparatively minimal energy expenditure.

In this separation phase on the retaining element, it is conceivable that the sorted potatoes and/or the sorted solid bodies after their discharge from the area of the separation plane can be detected and/or conveyed farther as additionally classified partial quantities. In this context, large and small or heavy and light parts can reach pre-sorting discharge belts.

By means of the flow and excitation movements which can be introduced above the retaining element or its separation plane, a mixed zone comprising turbulently distributed separation goods is defined as a whole. This can be advantageously utilized in that, at the same time, the separation effect of the system can be influenced with the first lifting air stream which is oriented substantially vertical to the separation plane and the at least one transverse air stream substantially extending parallel to the separation plane. With regard to different soil classes or varying moisture degrees of the mixture, optimizations of the separation process with minimal expenditure are thus possible.

The excitation concept according to the invention provides also that by means of a vibration movement of the retaining element that can be mechanically introduced by means of the actuating member, an excitation of the mixture can be realized in the area of the mixed zone in addition to the lifting air stream and to the transverse air stream.

The retaining element which is variable with respect to its constructive configuration is advantageously in the form of a baffle plate that is acting as a conveying plate. It is adjustable in the mounted position, in particular in regard to its slant. This baffle plate can be provided at least over areas thereof with a grid-like structure such that an additional screening effect is achieved.

The optimal orientation of the baffle plate relative to the conveyed stream that is supplied via the conveying device provides that the baffle plate can have a mounted position which is slanted opposite to or in the supply direction of the mixture. It has been found to be advantageous for the baffle plate to be adjusted at a slant opposite to a sorting direction provided for the crop. In addition to this substantially variable adjusting possibility it is provided that the baffle plate can also be designed to be pivotable in the phase of use. An optimal control possibility in the area of the baffle plate is achieved in that the latter is provided with a vibration drive acting as an actuating member.

For the area of the solid body discharge, it is provided that the plate-shape retaining element can interact here with respective star wheels as conveying members. For the controlled discharge of the solid bodies it is provided that at least in the outlet area a flexible deflection mat is provided. In its vicinity the comparatively light potatoes are retained and engaged by the star wheels such that a movement into the sorting direction is realized. The comparatively heavy solid bodies overcome the resistance of the deflection mat and are moved thus in the discharge direction.

The separation system in the area of the retaining element is embodied as a substantially closed unit with box-shaped enclosure parts that are connected to a blower arrangement. With this blower arrangement as a starting point, a supply air stream can be conveyed into the area of the retaining element. A housing group effecting a control of this supply air stream is designed such that, upstream of the area of the separation stretch, a deflection in the direction of the lifting air stream which is extending below the retaining element as well as of the transverse air stream extending in the mixed zone is possible.

The constructive configuration of this air guiding action provides that the supply air stream in the area below the retaining element and in the area behind the solid body discharge can be pressed into respective separate guiding channels. In this connection, it is achieved that from this guiding channel the lifting air stream as well as the transverse air stream can be conveyed in a targeted fashion into the provided areas of the retaining element. By an appropriate air guiding action the flow effect in the area of the mixed zone acting as a "fluidic separation bed" can be affected and optimized, if necessary.

The further configuration of the retaining element provides that the latter is provided with a loosening member which is extending at least section-wise along the separation plane. Expediently, the loosening member is embodied in the form of a scraper floor that is circulatingly movable in the area of the retaining element. In this context, a respective movement direction of the loosening member can be adjusted. Also, it is conceivable that the velocity of the loosening member is changeable and the excitation function can be varied in this way.

The retaining element is provided with a transfer roller in the area of the crop discharge that is positioned opposite the solid body discharge. The transfer roller can be positioned in adaptation to the respective position of use of the retaining element at different heights and/or spacings relative to the "transfer edge" of the retaining element.

BRIEF DESCRIPTION OF THE DRAWINGS

Further details and advantageous embodiments of the invention result from the following description and the drawing in which an exemplary embodiment of the system according to the invention is illustrated. In the drawing, it is shown in.

DESCRIPTION OF PREFERRED EMBODIMENTS

Figure 1:
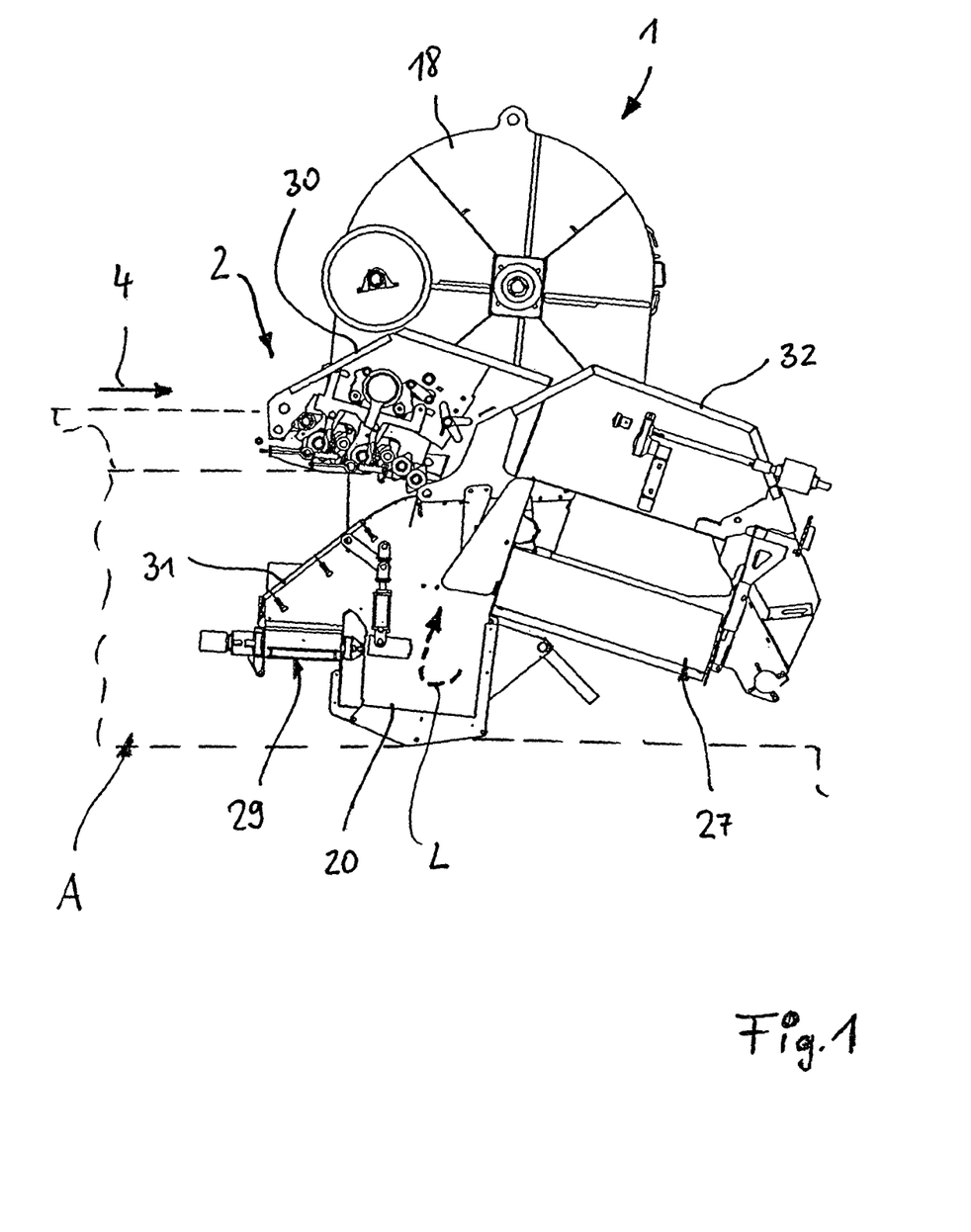
FIG. 1 a front view of the separation system according to the invention.
Figure 2:
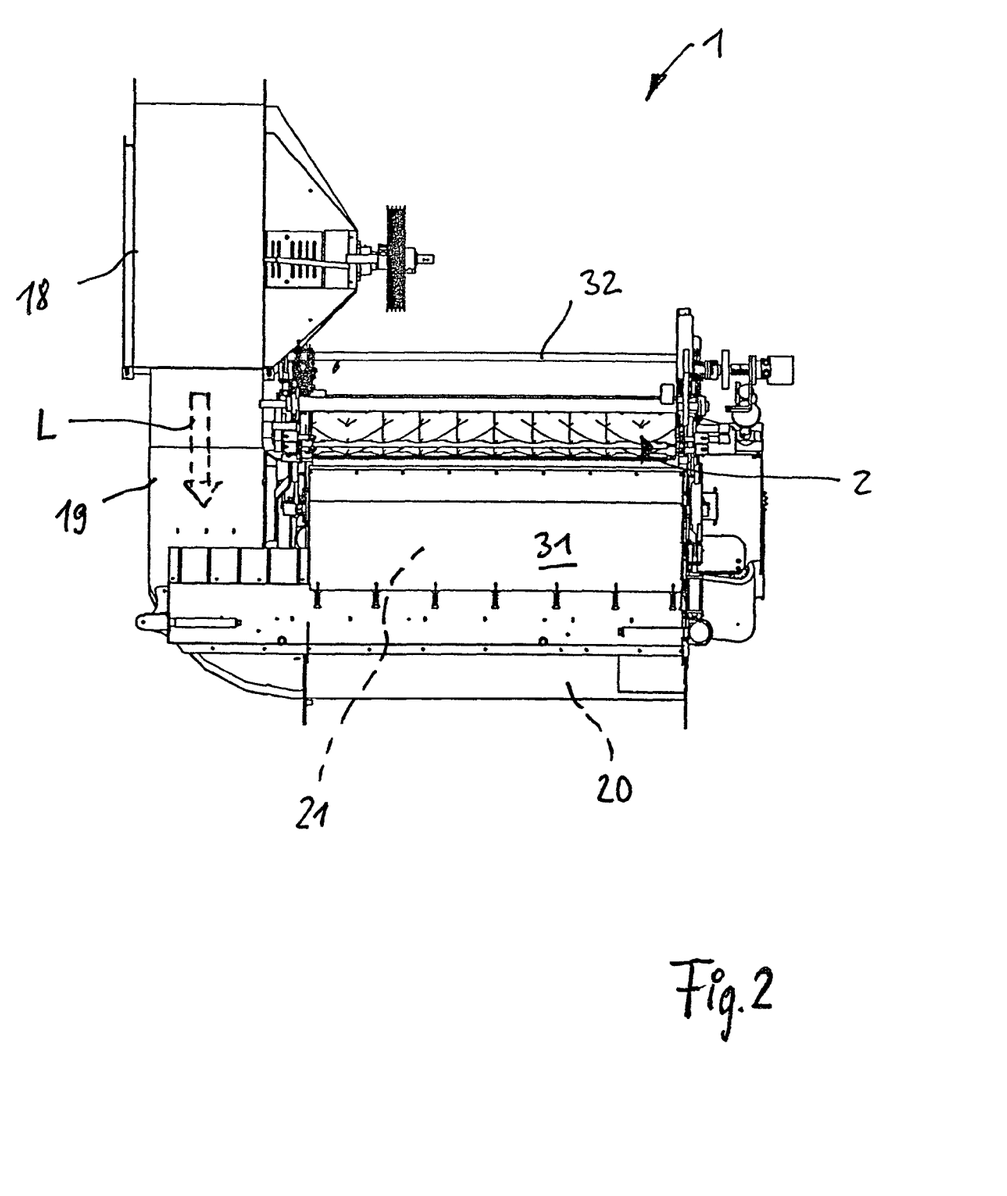
FIG. 2 a side view of the separation system according to FIG. 1.

In FIG. 1, a separation system, identified as a whole by 1, is illustrated which can be integrated into a potato harvesting or preparation machine referenced in general by A. In this context, the separation system 1 can be provided as a substantially independent device of variably usable systems.

The separation system 1 is provided for separation of potatoes or similar crop E from the mixture G with clods, rocks, and similar solid bodies F. When looking at FIG. 1 in conjunction with FIG. 4, it is apparent that the separation system 1 is provided with the conveying device 2 that supplies the substantially compact mixture G as a conveyed stream 4, from where the mixture G, moved into the area of at least one drop stage 3 and, in the process, influenced by means of a conveying medium in the form of an air stream L (FIG. 4) integrated into the system, can be separated such that respectively at least the crop E as well as the solid bodies F as individual separated goods can be conveyed farther and can be discharged from the separation system 1.

Figure 7:
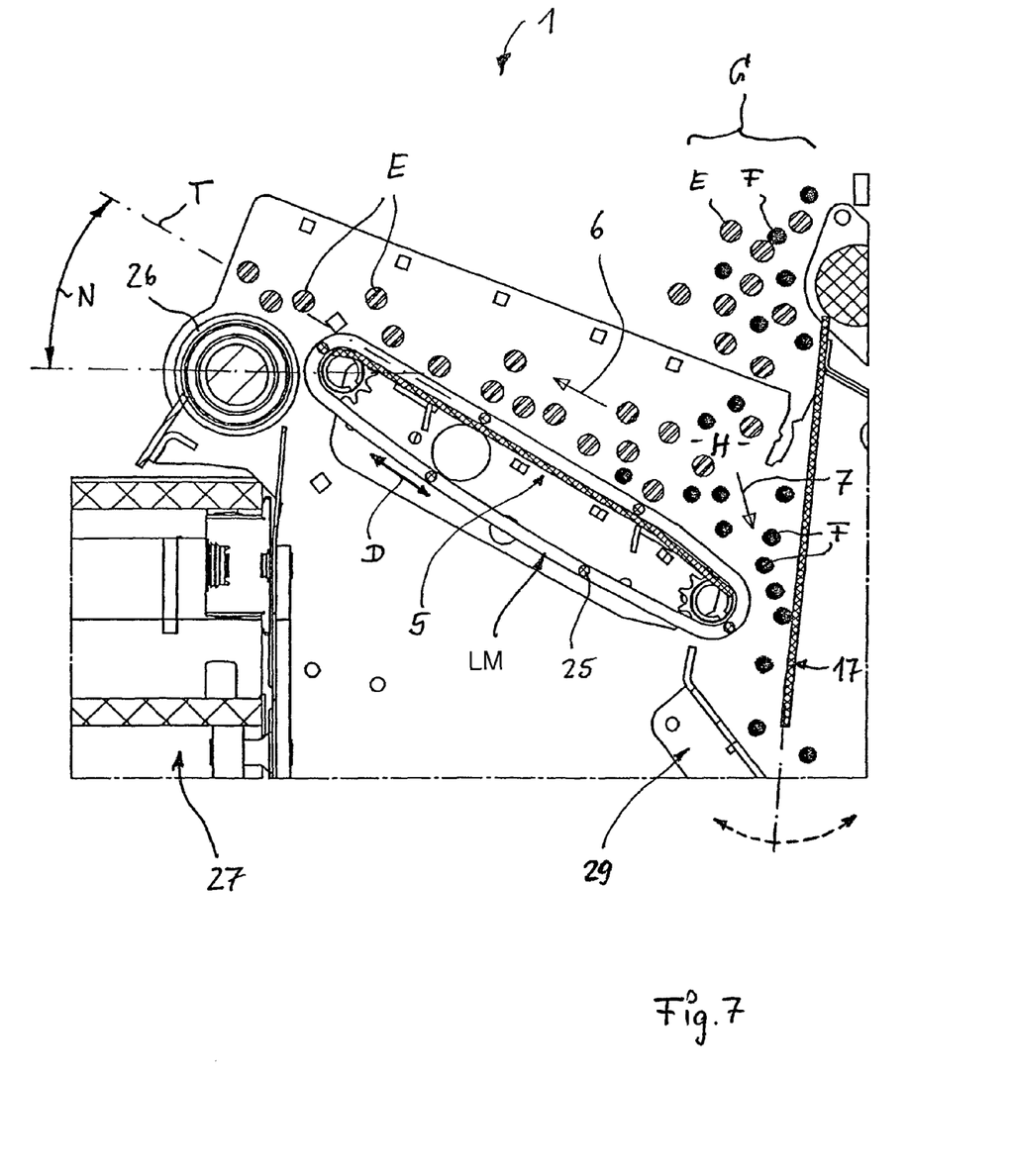
FIG. 7 an enlarged detail illustration of the system in the area of the retaining element with scraper floor.

Based on a generally known utilization of an air stream L, the concept according to the invention of the separation system 1 is directed at a retaining element 5 now being provided, downstream of the drop stage 3 which effects loosening of the mixture G, which is facing the falling goods E, F to be separated and is combined functionally with the at least one air stream L. This retaining element 5 interacts with the air stream L as a functional unit in such a way that, in a substantially closed system, with the top side of the retaining element 5 as a starting point, at least the crop E and the solid bodies F, as respectively sorted individual parts, can be separately conveyed farther in a respective substantially oppositely extending conveying direction 6 or 7 (FIG. 7).

Figure 6:
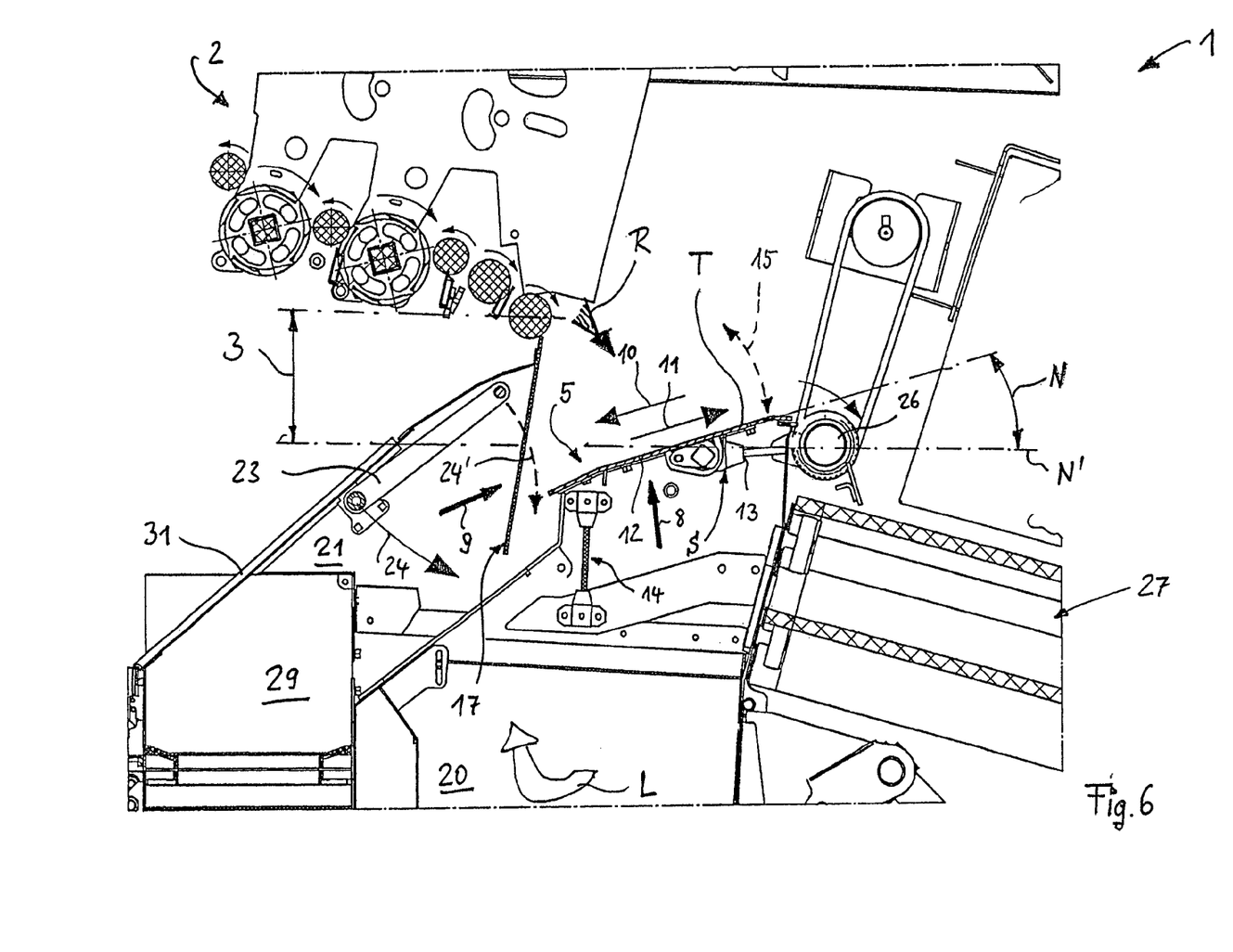
FIG. 6 an enlarged detail view according to detail VI of FIG. 5.

The compact configuration of this separation unit provides that in the area of the retaining element 5 also several "primary" air streams L (not illustrated) can be provided. A further increase of efficiency of the separation process that is realizable with minimal energy input can be achieved in that the retaining element 5 is provided with at least one actuating member S (FIG. 6) that is influencing its position and/or movement.

Figure 3:
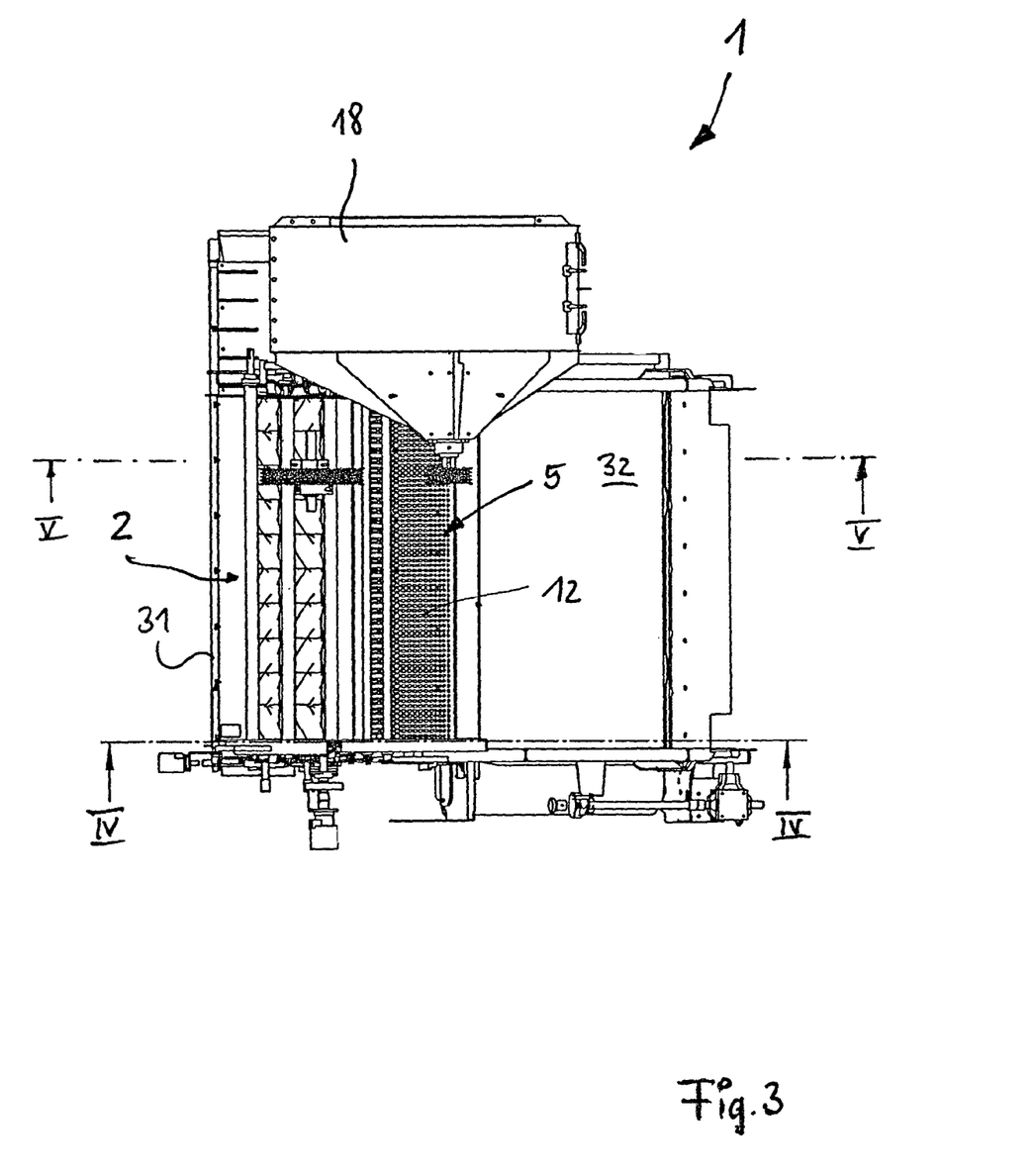
FIG. 3 a plan view of the separation system according to FIG. 1.
Figure 4:
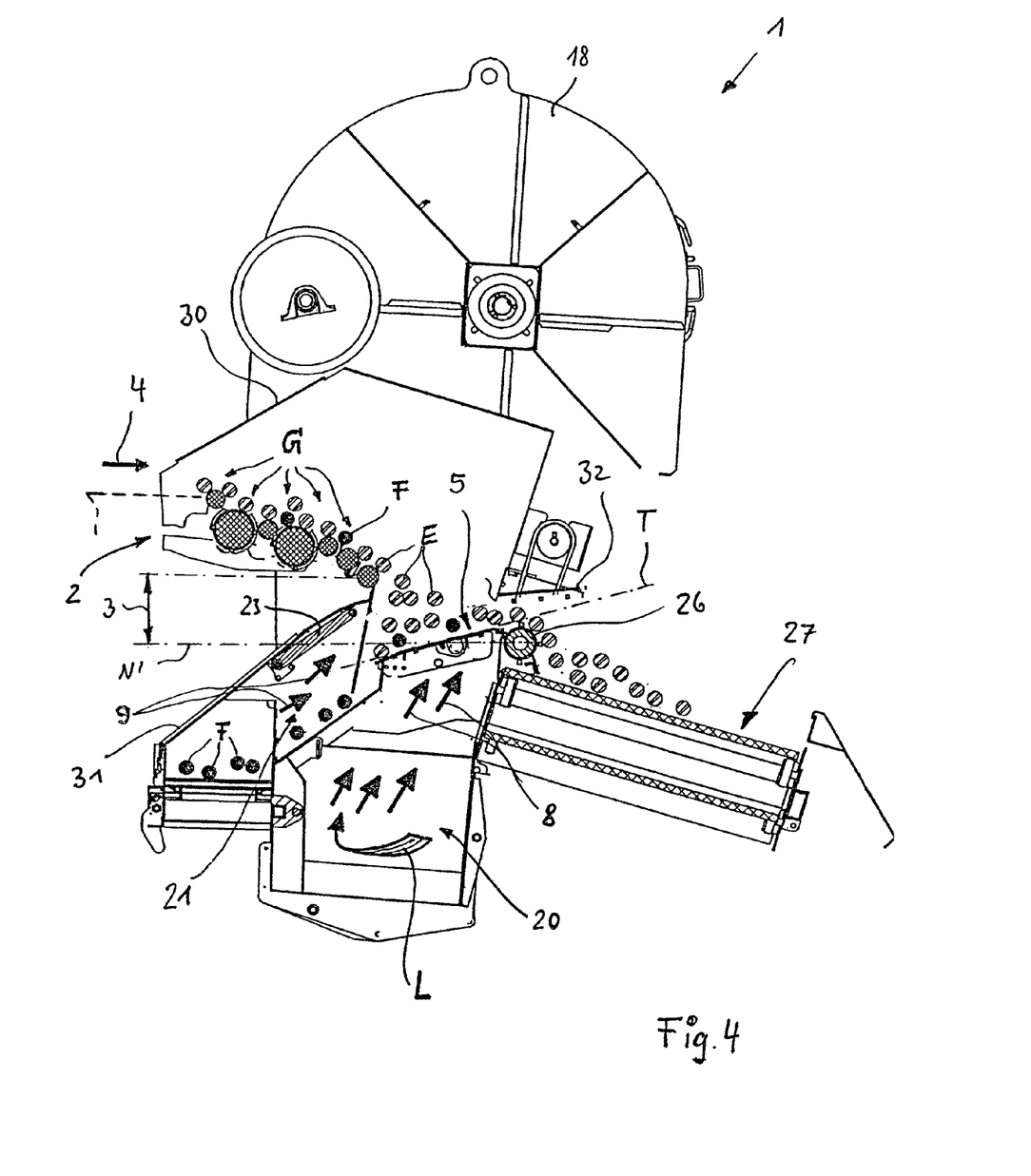
FIG. 4 a partially sectioned front view according to line IV-IV in FIG. 3.
Figure 5:
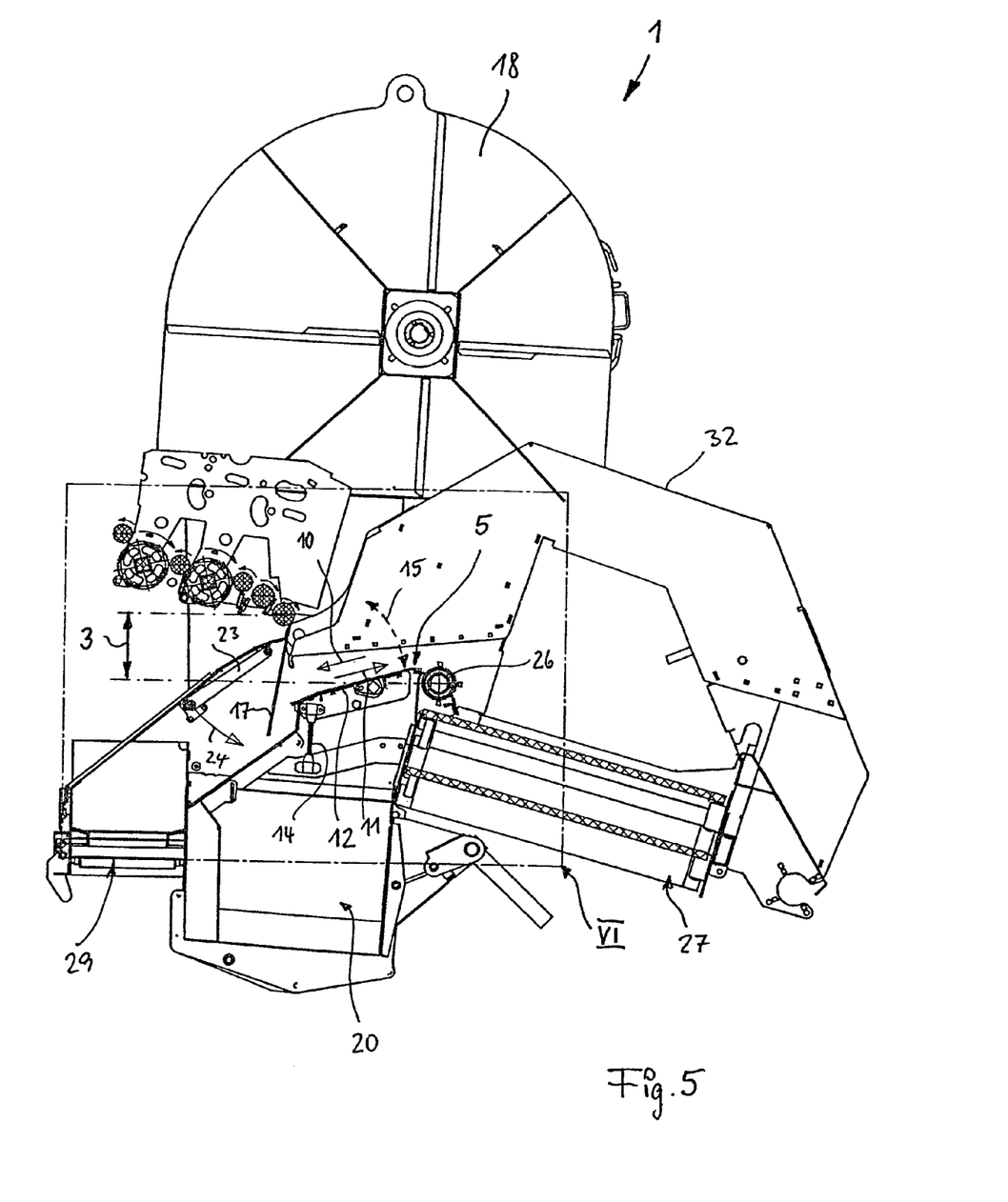
FIG. 5 a section illustration similar to FIG. 4 according to line V-V of FIG. 3.

When looking at FIG. 3 in conjunction with FIG. 4, it is apparent that above the retaining element 5 that can be at least partially flowed through by the air stream L, a separation plane T (dash-dotted line, FIG. 4) is defined that at least phase-wise is located below the crop E as well as the solid bodies F in an enriched loosened state (FIG. 4). A particularly efficient embodiment of the separation system 1 is achieved in that in the area of the retaining element 5 at least above the separation plane T two air streams in the form of a lifting air stream 8 and a transverse air stream 9 are provided that are oriented in different directions of action onto the crop E and the solid bodies F.

In the illustration according to FIG. 4 it is apparent that the lifting air stream 8 and the transverse air stream 9 are embodied as respective partial air streams of the basic air stream L. It is also conceivable to provide two air supplies (not illustrated) that are acting independent of each other and to generate with them the lifting air stream 8 and the transverse air stream 9.

Figure 8:
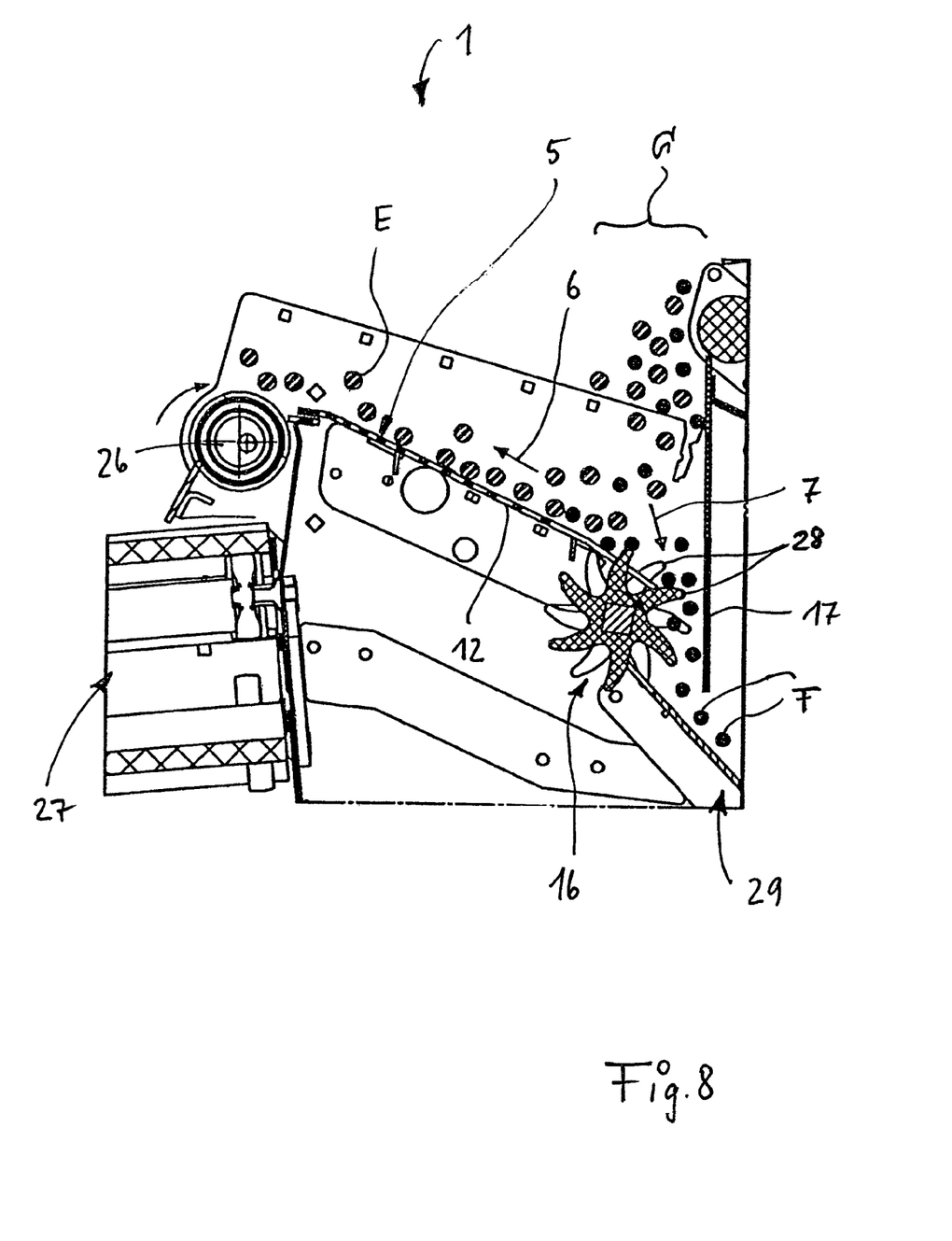
FIG. 8 a detail view similar to FIG. 7 with the retaining element interacting with the star wheels.

Based on the loosened state of the mixture G described above and illustrated in FIG. 4 in the area of the drop stage 3, the system is adjustable such that by means of the retaining element 5, which is illustrated enlarged in FIG. 7 and FIG. 8, a movement (conveying direction 6) that is acting at least in one sorting direction can be imparted onto the crop E and a movement (conveying direction 7) acting in a discharge direction can be imparted onto the solid bodies F, respectively.

In this phase of action of the system 1, the retaining element 5 is oriented such that the separation of the crop E from the solid bodies F in the area of the separation plane T can be initiated by means of gravity, rebound and/or airflow action(s). It has been found that, by the superimposed excitation effects, a separation can be efficiently initiated and, to a large extent, a "sorting" of the individual parts E and F from the mixture G is realized (FIG. 7).

In this phase of separated further conveying, it is also conceivable that the sorted potatoes E and/or the sorted solid bodies F, after their discharge from the area of the separation plane T, are detected and/or further conveyed additionally as classifiable partial quantities (not illustrated).

Already the realization of the separation system 1 as a prototype has proven that above the retaining element 5 or its separation plane T a mixed zone that comprises turbulently distributed goods to be separated is defined in the manner of a "fluidic separation bed". In this zone, the "excited mixture" can be engaged at the same time by the first lifting air stream 8 which is oriented substantially vertical to the separation plane T and the at least one transverse air stream 9 which is extending substantially parallel to the separation plane T. By variable processing parameters, this separation effect of the system can be adjusted optimally or can be influenced during the separation process.

A comparatively simple improvement of this excitation state can be achieved in that by means of a vibration movement 10, 11 (FIG. 6) of the retaining element 5 introduced by the actuating member S, an excitation of the mixture G becomes effective in the area of the separation plane T that is effective in addition to the lifting air stream 8 and the transverse air stream 9. When looking at FIG. 3 in conjunction with FIG. 6, it is apparent that the retaining element 5 is formed as a baffle plate 12 which is adjustable in regard to its slant N.

From the plan view according to FIG. 3, it is also apparent that the baffle plate 12 at least in sections thereof has a grid-like structure with through openings.

The constructive arrangement of this baffle plate 12 can be realized substantially in a variable way. In this connection, respective mounted positions are conceivable are that can be slanted either opposite to or in the supply direction R (FIG. 6) of the mixture G. In an advantageous embodiment, it is provided that the baffle plate 12 (based on the supply direction R, FIG. 6) is slantedly adjusted (slant N) opposite to a sorting direction provided for the crop E (conveying direction 6). This adjustment of the system is provided also in the embodiments according to FIG. 7 and FIG. 8.

For a functional improvement of the mixture excitation required for separation, it is provided that the baffle plate 12 can be also supported in the position of use to be pivotable or translatorily movable. For this purpose, the baffle plate 12 is provided in particular with a vibratory drive acting as the actuating member S. The latter engages the bottom side of the baffle plate 12 by means of a drive linkage 13 comprising an eccentric drive (not illustrated). On the other hand, the baffle plate 12 is secured by a motion link 14 such on the machine frame that the vibration movements (arrow 10 and 11) illustrated in FIG. 6 in transitory movement directions relative to the separation plane T are possible. Also, it is conceivable that in the area of the actuating member S a drive is provided with which radial vibration movements (arrow 15) can be performed about a pivot point (not illustrated) of the baffle plate 12.

When looking at FIG. 4 in conjunction with FIG. 8, a constructive further embodiment of the system is apparent wherein the retaining element 5 at least in the area of the solid body discharge is provided with respective star wheels 16 as additional braking and conveying members. In the area of these star wheels 16 an additional guiding action for the individual parts F arriving here can be achieved in that an in particular flexible deflection mat 17 delimits an upstream "collecting space" H. From this zone, the comparatively light potatoes E can be returned in the sorting direction 6 onto the retaining element 5. The comparatively heavy rocks F are discharged onto a discharge component group 29.

When looking at the system as a whole according to the illustrations in FIG. 1 to FIG. 5, it is apparent that the separation system 1 that forms an independent device begins at a substantially closed hood-shaped blower arrangement 18. As already illustrated, the supply air stream L is produced by a blower, deflected from the latter in the area of the separation stretch T in the direction of the vertical lifting air stream 8 as well as the transverse air stream 9, and thus conveyed into the "separation zone" of the retaining element 5.

Beginning at the blower arrangement 18, a supply channel 19 (FIG. 2) is provided from which the air stream L can be pressed into the respective guiding channels 20 and 21 (FIG. 4) in such a way that the already discussed partial air streams in the area of the lifting air stream 8 and of the transverse air stream 9 are produced. A housing-type construction of these guiding channels 20 and 21 enables in their interior a variable design with additional control and deflection parts, wherein a pivot plate 23 (FIG. 6) can be moveable in an exemplary fashion into a guiding positions illustrated by arrows 24, 24'. It is also conceivable to integrate into the housing contour additional nozzles or similar parts accommodating the air stream L so that a directed introduction of partial air streams into the mixed zone above the retaining element 5 is possible and utilizable for the separation process (not illustrated).

The illustrations show clearly that the system can be embodied to be substantially closed by means of respective cover parts 30, 31, 32 (FIG. 1, FIG. 4) and, in this way, respective dust parts or similar soil structures can be contained within the system in an operating phase of the system 1.

Based on the basic configuration of the system illustrated in FIGS. 1 to 6, in FIG. 7 a second embodiment with components in the area of the retaining element 5 is illustrated so that its functional effect can be improved. It is apparent in this context that the retaining element 5 is provided with a loosening member LM correlated with it at least section-wise along the separation plane T. In an advantageous embodiment it is provided that the loosening member LM is designed in the form of a scraper floor 25 which is circulatingly moveable in the direction of arrow D. For adaptation to variable conditions of use, it is provided that the respective movement direction D and/or the velocity of the loosening member LM is/are adjustable variably to a large extent.

For discharging the crop E from the retaining element 5, in the area of the crop discharge a transfer roller 26 is preferably provided from which the crop E is transferred onto a conveying member 27 for discharging it.

In FIG. 8, the system in the area of the retaining element 5 is illustrated with the screening stars 16 wherein the latter in the area of the deflection mat 17 can influence the loosened individual parts E and F like a "screening star gate". The screening stars 16 which are rotating preferably in the discharge direction 6 of the crop E pass through the retaining plate 5 with respective fingertips 28 so that, from the latter, the potatoes E are discharged in the conveying direction 6 and the rocks F, as a result of their weight, are discharged in the conveying direction 7.

The afore described system with a retaining element/air excitation combination is designed such that in particular in the area of the retaining element 5 different ones of the afore described component groups can be variably embodied and arranged. In particular, as needed, different scraper floors 25 and/or screening stars 16 can be interacting with the variably configurable air supply L wherein also the excitation of the retaining element 5 with the "mechanical" actuating member S is constructively adaptable. Also, it is conceivable to combine the system with several retaining elements or to integrate the air supply like a suction air system into the housing concept of the separation area (not illustrated).

What is claimed is:

1. A separation system for separating a crop from a mixture, the separating system comprising:
   a conveying device supplying a substantially compact mixture as a conveyed stream, the mixture comprising the crop and admixtures in the form of clods, rocks, and similar solid bodies;
   at least one drop stage arranged downstream of the conveying device and effecting loosening of the mixture supplied by the conveying device to the at least one drop stage;
   means for supplying an air stream to the mixture, wherein the air stream is interacting as a conveying medium with the mixture;
   at least one retaining element downstream of the at least one drop stage, wherein the at least one retaining element is facing the crop and the admixtures falling down within the at least one drop stage and is interacting with the air stream such that, beginning at the at least one retaining element, the crop and the admixtures are separately conveyed as sorted individual parts in opposite conveying directions, respectively, and separately discharged from the separation system;
   wherein, above the at least one retaining element that at least section-wise is flowed through by the air stream, a separation plane is defined that at least phase-wise is located below the crop and below the admixtures, the crop and the admixtures being in an excited loosened state;
   wherein in the area of the at least one retaining element, at least above the separation plane, the air stream is divided into a lifting air stream and a transverse air stream, wherein the lifting air stream and the transverse air stream are oriented in different directions of action onto the crop and the admixtures;
   wherein, above the at least one retaining element or the separation plane, a mixed zone in which the crop and the admixtures are turbulently distributed is defined, wherein a separation action of the separation system is affected in the mixed zone simultaneously by the lifting air stream that is oriented substantially vertical to the separation plane and the transverse air stream that is extending substantially parallel to the separation plane.

2. A separation system for separating a crop from a mixture, the separating system comprising:
   a conveying device supplying a substantially compact mixture as a conveyed stream, the mixture comprising the crop and admixtures in the form of clods, rocks, and similar solid bodies;
   at least one drop stage arranged downstream of the conveying device and effecting loosening of the mixture supplied by the conveying device to the at least one drop stage;
   means for supplying an air stream to the mixture, wherein the air stream is interacting as a conveying medium with the mixture;
   at least one retaining element downstream of the at least one drop stage, wherein the at least one retaining element is facing the crop and the admixtures falling down within the at least one drop stage and is interacting with the air stream such that, beginning at the at least one retaining element, the crop and the admixtures are separately conveyed as sorted individual parts in opposite conveying directions, respectively, and separately discharged from the separation system;
   star wheels as conveying members arranged at an admixture discharge, wherein the at least one retaining element interacts with the star wheels.

3. The separation system according to claim 1, wherein the at least one retaining element is provided with at least one actuating member affecting a position and/or a movement of the at least one retaining element.

4. The separation system according to claim 2, wherein, above the at least one retaining element that at least section-wise is flowed through by the air stream, a separation plane is defined that at least phase-wise is located below the crop and below the admixtures, the crop and the admixtures being in an excited loosened state.

5. The separation system according to claim 4, wherein in the area of the at least one retaining element, at least above the separation plane, the air stream is divided into a lifting air stream and a transverse air stream, wherein the lifting air stream and the transverse air stream are oriented in different directions of action onto the crop and the admixtures.

6. The separation system according to claim 1, wherein the at least one retaining element is configured to impart a first movement, acting at least in a sorting direction, on the crop and to impart a second movement, acting in a discharge direction, onto the admixtures.

7. The separation system according to claim 1, wherein separation of the crop from the admixtures in the area of the separation plane is realized by gravity, rebound and/or action of the air stream.

8. The separation system according to claim 7, wherein separation is initiated by superimposed excitation actions.

9. The separation system according to claim 7, wherein the crop and/or the admixtures after having been sorted and discharged from the area of the separation plane are detected and/or further conveyed as classified partial quantities.

10. The separation system according to claim 5, wherein, above the at least one retaining element or the separation plane, a mixed zone in which the crop and the admixtures are turbulently distributed is defined, wherein a separation action of the separation system is affected in the mixed zone simultaneously by the lifting air stream that is oriented substantially vertical to the separation plane and the transverse air stream that is extending substantially parallel to the separation plane.

11. The separation system according to claim 3, wherein the actuating member mechanically causes the at least one retaining element to carry out a vibration movement and the vibration movement effects an excitation of the mixture in the mixed zone in addition to an excitation action of the lifting air stream and of the transverse air stream.

12. The separation system according to claim 3, wherein the at least one retaining element is a baffle plate that is adjustable in regard to a slant of the baffle plate.

13. The separation system according to claim 12, wherein the baffle plate comprises at least section-wise a grid-like structure.

14. The separation system according to claim 12, wherein the baffle plate, relative to a horizontal position, comprises a first mounted position that is slanted opposite to a supply direction of the mixture or a second mounted position that is slanted in the supply direction.

15. The separation system according to claim 12, wherein the baffle plate is slantedly adjustable in a direction opposite to a sorting direction of the crop.

16. The separation system according to claim 12, wherein the baffle plate is pivotable and/or slidable while in use.

17. The separation system according to claim 12, wherein the actuating member is a vibration drive.

18. The separation system according to claim 2, wherein the air stream is divided into several partial air streams that are effective in the area of the at least one retaining element.

19. The separation system according to claim 2, further comprising a flexible deflection mat provided at least in the area of the star wheels.

20. The separation system according to claim 1, wherein the means for supplying an air stream is a blower arrangement, wherein the air stream is conveyed into the area of the at least one retaining element and along a flow path to the at least one retaining element is deflected, upstream of the area of the separation plane, to form the lifting air stream and the transverse air stream.

21. The separation system according to claim 20, wherein the blower arrangement comprises separate guiding channels, wherein the air stream in the area below the at least one retaining element and in the area behind an admixture discharge is pressed into the separate guiding channels such that the lifting air stream and the transverse air stream are conveyed from the separate guiding channels in a targeted fashion into the area of the at least one retaining element.

22. The separation system according to claim 1, wherein the at least one retaining element comprises a loosening member arranged at least section-wise along the separation plane.

23. The separation system according to claim 22, wherein the loosening member is a circulatingly movable scraper floor.

24. The separation system according to claim 23, wherein a movement direction of the loosening member is adjustable.

25. The separation system according to claim 24, wherein a velocity of the loosening member is changeable.

26. The separation system according to claim 1, wherein the at least one retaining element in the area of a crop discharge is provided with a transfer roller.

\* \* \* \* \*